US012595822B2

(12) United States Patent
Landrieve

(10) Patent No.: US 12,595,822 B2
(45) Date of Patent: Apr. 7, 2026

(54) BEARING WITH DISTANCE SENSOR AND CONTROL UNIT

(71) Applicant: AKTIEBOLAGET SKF, Gothenburg (SE)

(72) Inventor: Franck Landrieve, Fondettes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 264 days.

(21) Appl. No.: 18/470,926

(22) Filed: Sep. 20, 2023

(65) Prior Publication Data

US 2024/0110597 A1 Apr. 4, 2024

(30) Foreign Application Priority Data

Oct. 4, 2022 (DE) .......................... 102022210493.5

(51) Int. Cl.
*F16C 19/52* (2006.01)
*F16C 19/38* (2006.01)

(52) U.S. Cl.
CPC ............ *F16C 19/52* (2013.01); *F16C 19/381* (2013.01); *F16C 2233/00* (2013.01)

(58) Field of Classification Search
CPC .... F16C 19/52; F16C 19/381; F16C 2233/00; F16C 41/00; F16C 2300/14; F16C 2360/31; F16C 19/14; F16C 33/30
USPC ......................................................... 340/682
See application file for complete search history.

(56) References Cited

U.S. PATENT DOCUMENTS

| | | | | | |
|---|---|---|---|---|---|
| 11,300,160 | B2 * | 4/2022 | Landrieve | ............... | F16C 41/00 |
| 2006/0245677 | A1 * | 11/2006 | Kenworthy | ............. | G01P 3/443 |
| | | | | | 384/448 |
| 2020/0340524 | A1 * | 10/2020 | Barciet | ................. | F16C 19/361 |

\* cited by examiner

*Primary Examiner* — Eric Blount
(74) *Attorney, Agent, or Firm* — J-TEK LAW PLLC; Scott T. Wakeman; Mark A. Ussai

(57) ABSTRACT

A bearing includes a first ring and a second ring capable of rotating concentrically relative to each other, and at least one distance sensor mounted on the first ring and facing a surface of the second ring to measure radial displacements between the first and second rings. The bearing further includes a control unit connected to the distance sensor and adapted to calculate the value of a deflection of the bearing by subtracting a predetermined value from the value of the relative radial displacement between the first and second rings detected by the distance sensor.

12 Claims, 2 Drawing Sheets

BEARING WITH DISTANCE SENSOR AND CONTROL UNIT

CROSS-REFERENCE

This application claims priority to German patent application no. 102022210493.5 filed on Oct. 4, 2022, the entire contents of which are fully incorporated herein by reference.

BACKGROUND OF THE INVENTION

The present invention relates to bearings, and more particularly to large-diameter rolling bearings that can accommodate axial and radial loads and having an inner ring and an outer ring arranged concentrically about an axis of rotation running in an axial direction.

Such large-diameter rolling bearings may be used for example in a tunnel boring machine, in a mining extraction machine or in a wind turbine.

A large-diameter rolling bearing typically comprises two concentric inner and outer rings, and at least two rows of rolling elements, such as rollers, arranged between the rings. Such rolling bearings are generally subjected to high constraints by the structure on which they are assembled by bolts.

Conventional bearing assembly procedures specify high level of assembly surface geometry quality and conformance to bolt tensioning specifications so that the bearing geometry can be maintained within specification during machine operation. In fact, bearing operating conditions and bearing life are strongly influenced by the geometry of the assembly surfaces, because assembly surface geometry influences bearing internal geometry by causing deflections of the bearing rings. Further, there may also be deflections on the bearing due to applied loading, which could be also increased by insufficient tightening of the bearing due to bolt loading be too low or below recommended levels.

There are solutions known for measuring the bolt load but no known solution for monitoring bearing deflection.

SUMMARY OF THE INVENTION

One aim of the present invention is to overcome the drawback noted above.

The present invention relates to a bearing comprising a first ring and a second ring, at least one of the first and second rings being capable of rotating concentrically relative to the other ring, and at least one distance sensor mounted on the first ring and facing a surface of the second ring to measure radial displacements between the first and the second rings.

According to a general feature, the bearing further comprises a control unit connected to the distance sensor and adapted to calculate the value of a deflection of the bearing by subtracting a predetermined value from the value of the relative radial displacement between the first and second rings detected by the distance sensor.

Due to the present invention, the operating deflection of the bearing can be monitored in real time, i.e., during bearing operation. Therefore, it is possible to know whether a maximum allowed deflection of the bearing has been reached during operation. Thus, an overload condition of the bearing may be determined or detected according to the value of the calculated deflection. This predetermined threshold may be, for example, the value of the deflection above which severe damage can be caused to the rolling bearing.

In one embodiment, the control unit may be further adapted to trigger an alarm when the value of the calculated deflection of the bearing is higher than a predetermined threshold.

The control unit may be located remote from the components of the rolling bearing. Alternatively, the control unit could be mounted on one of the components of the rolling bearing, for example the first or second ring.

Preferably, the predetermined value is equal to the internal radial clearance of the bearing prior to operation.

In one embodiment, the distance sensor radially faces the surface of the second ring.

The first ring may include at least one radial through-hole inside of which the distance sensor is at least partly disposed.

The distance sensor may be a proximity sensor, such as an inductive sensor, an ultrasonic sensor, or an optical sensor.

In one embodiment, the bearing further comprises at least one row of axial rolling elements arranged between radial raceways provided on the rings and at least one row of radial rolling elements arranged between axial raceways provided on the rings.

The terms "axial rolling elements" is understood to mean rolling elements adapted to accommodate axial loads whereas the terms "radial rolling elements" is understood to mean rolling elements adapted to accommodate radial loads.

The second ring may include a protruding or projecting nose engaged into an annular groove of the first ring and provided with the axial raceway and with the radial raceway of the second ring.

In one embodiment, the rolling bearing comprises at least two rows of axial rolling elements each arranged between radial raceways provided on the rings, the two rows of axial rolling elements being disposed axially on each side of the nose of the second ring.

The invention also relates to a method for monitoring a bearing in a machine, the bearing comprising a first ring and a second ring capable of rotating concentrically relative to one another, the method comprising the following steps:

measuring a radial displacement between the first and the second rings of the bearing; and calculating the value of a deflection of the bearing by subtracting a predetermined value from the value of the measured relative radial displacement between the first and second rings of the bearing.

The method may further comprise the step of triggering an alarm when the value of the calculated deflection of the bearing is higher than a predetermined threshold.

The step of measuring a radial displacement between the first and the second rings of the bearing may be done by at least one distance sensor mounted on the first ring of the bearing and facing a surface of the second ring.

BRIEF DESCRIPTION OF THE SEVERAL VIEWS OF THE DRAWINGS

The present invention and its advantages will be better understood by studying the detailed description of a specific embodiment given by way of a non-limiting example and illustrated by the appended drawings on which.

DETAILED DESCRIPTION OF THE INVENTION

Figure 1:
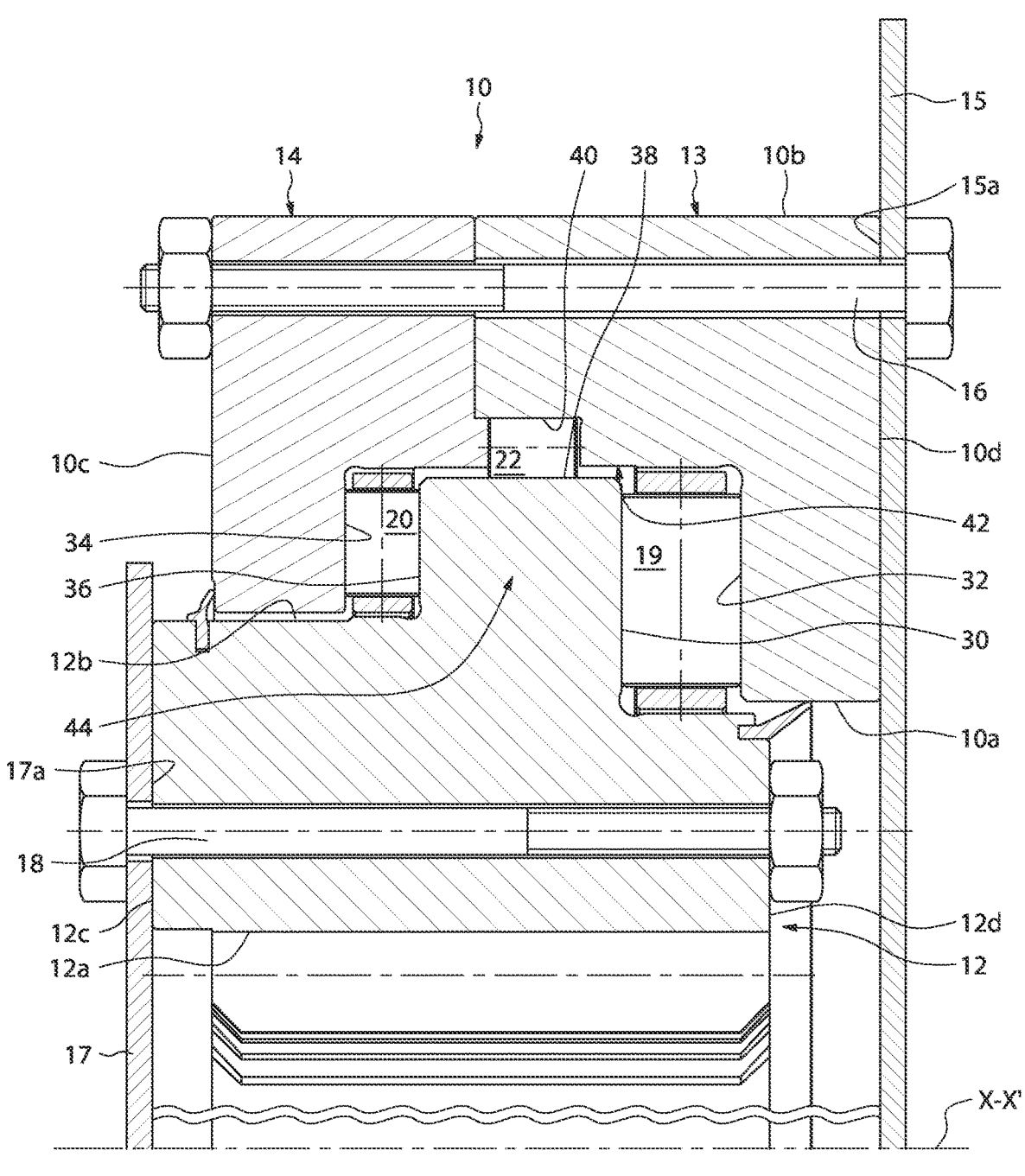
FIG. 1 is a partial cross-section of a rolling bearing according to an example of the invention.
Figure 2:
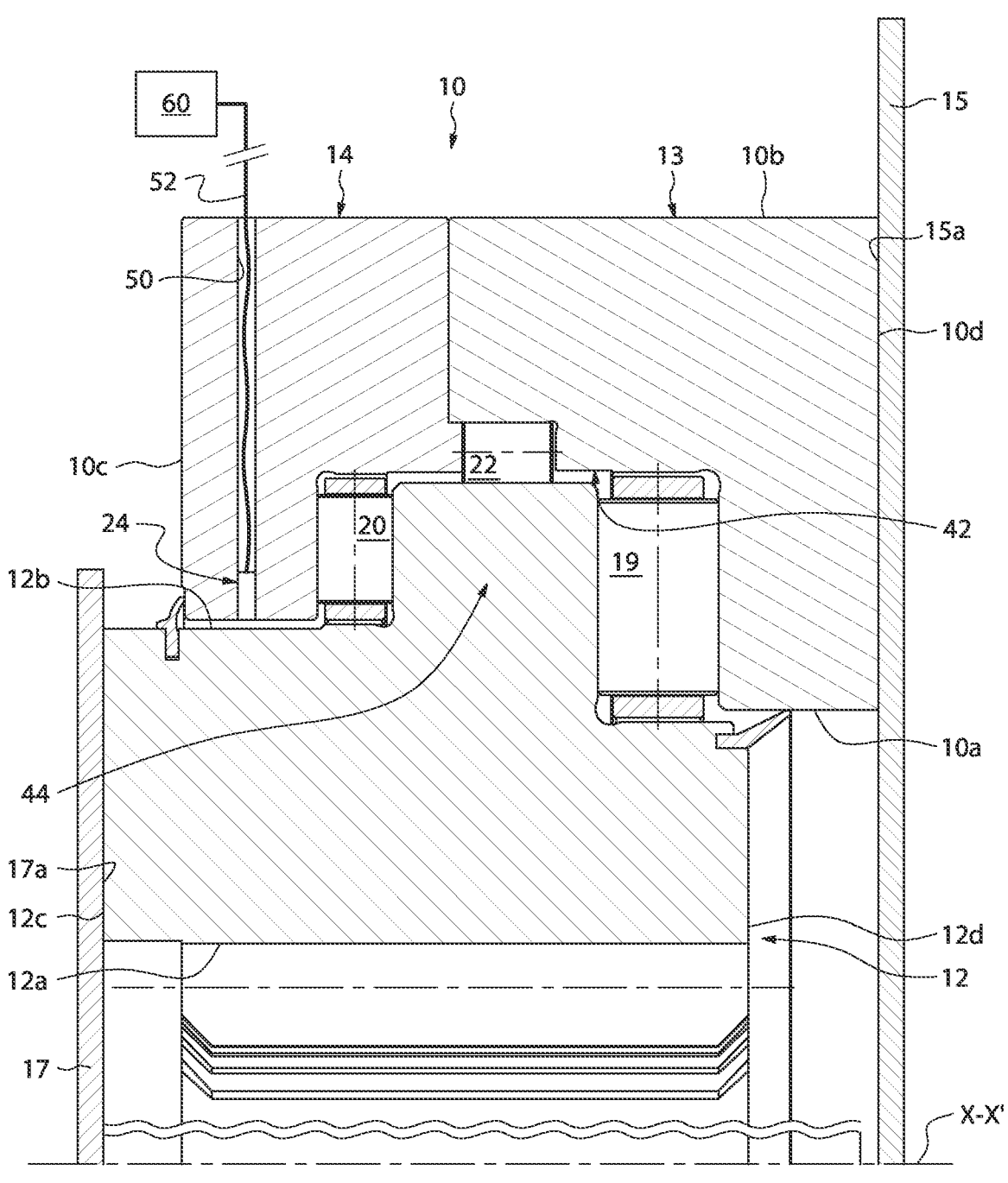
FIG. 2 is another partial cross-section of the rolling bearing of FIG. 1.

The rolling bearing depicted in FIGS. 1 and 2 is a large-diameter rolling bearing comprising a first ring 10 and a second ring 12. In the illustrated example, the first ring 10 is the outer ring whereas the second ring 12 is the inner ring. The rolling bearing may for example be used in a machine, such as tunnel boring machine, a wind turbine or any other machines using a large diameter rolling bearing.

The outer and inner rings 10, 12 are concentric and extend axially along a bearing rotation axis X-X'. In the illustrated example, the rings 10, 12 are of the solid type.

The outer ring 10 is formed as a split ring and comprises a first ring part 13 and a second ring part 14 stacked one relative to the other in the axial direction. The ring parts 13, 14 are provided with a plurality of aligned axial through-holes (not referenced) for receiving bolts 16 to be join the ring parts 13, 14 and to assemble the outer ring 10 to a first part 15 of the structure of the associated machine.

The inner ring 12 is also provided with a plurality of axial through-holes (not referenced) for receiving bolt 18 to assemble the inner ring 10 to a second part 17 of the associated machine. The first and second parts 15, 17 of the machine are axially disposed on each side of the rolling bearing.

In the illustrated example, the rolling bearing comprises two rows of axial rollers 19, 20 which are arranged between the outer and inner rings 10, 12 in order to form an axial thrust, and a row of radial rollers 22 which are arranged between the rings to form a radial thrust.

As will be described later, the rolling bearing also comprises a distance sensor 24 to measure radial displacements between the outer and inner rings 10, 12. In the illustrated example, the sensor 24 is mounted on the outer ring 10. The sensor 24 measures radial distances to the inner ring 12. "A radial distance to the inner ring 12" is understood to mean a distance to the inner ring 12 with respect to the radial direction, the radial direction being perpendicular to the axis X-X' of the bearing.

The rollers 19, 20, 22 within each row are identical to one another. The axis of rotation of each roller 22 is parallel to the axis X-X' of the bearing and perpendicular to the axes of each of the rollers 19, 20. In the illustrated example, an axial length of each one of the rollers 19 is larger than an axial length of each one of the rollers 20. Alternatively, the axial length of the rollers 19 may be lesser than, or equal to, the axial length of each one of the rollers 20. Alternatively, the row of rollers 19 may be replaced by two rows of superimposed rollers.

The axial rollers 19 are arranged axially between annular radial raceways 30, 32 respectively formed on the inner and outer rings 12, 10. The raceways 30, 32 face each other in the axial direction. The rolling surface of each axial roller 19 is in axial contact with the raceways 30, 32.

The axial rollers 20 are arranged axially between annular radial raceways 34, 36 respectively formed on the inner and outer rings 12, 10. The raceways 34, 36 axially face each other. The rolling surface of each axial roller 20 is in axial contact with the raceways 34, 36. The rows of axial rollers 19, 20 are spaced apart from each other in the axial direction.

The radial rollers 22 are arranged radially between annular axial raceways 38, 40 respectively formed on the inner and outer rings 12, 10. The raceways 38, 40 face each other in the radial direction. The row of radial rollers 22 is radially offset outwardly with respect to the rows of axial rollers 19, 20. The rolling surface of each radial roller 22 is in radial contact with the raceways 38, 40. Further, the row of radial rollers 22 is axially located between the rows of axial rollers 19, 20.

The outer ring 10 includes an annular groove 42 opening in a radial direction inwardly toward the inner ring 12. The outer ring 10 includes an inner stepped cylindrical bore 10*a* from which the groove 42 is formed. The outer ring 10 also includes an outer cylindrical surface 10*b* which is radially opposite to the bore 10*a*. The outer ring 10 further includes two opposite radial frontal faces 10*c*, 10*d* which axially delimit the bore 10*a* and the outer surface 10*b* of the ring. The frontal faces 10*c*, 10*d* axially delimit the outer ring 10. The frontal faces 10*c*, 10*d* axially delimit the thickness of the outer ring.

As previously mentioned, the outer ring 10 is divided in the axial direction in two separate parts, the ring part 13 and the ring part 14. The ring parts 13, 14 delimit together the groove 42. The radial raceway 32 is located on the ring part 13 and the radial raceway 34 is located on the ring part 14 of the outer ring 10. The frontal face 10*d* is located on the ring part 13 and the frontal face 10*c* is located on the ring part 14.

The inner ring 12 includes an annular protruding nose 44 engaging into, or disposed within, the annular groove 42 of the outer ring 10. The nose 44 extends radially outwardly from a remainder of the inner ring 12.

The rows of axial rollers 19, 20 are arranged axially between the nose 44 of the inner ring 12 and the groove 42 of the outer ring 10. The rows of axial rollers 19, 20 are disposed on each side of the nose 44 and the radial raceways 30, 36 are located on the nose 44. The radial raceways 32, 34 are located on the groove 42 as discussed above.

The row of radial rollers 22 is arranged radially between the nose 44 of the inner ring 12 and the groove 42 of the outer ring 10. The axial raceways 38, 40 are respectively located on the nose 44 and the groove 42.

In the illustrated example, the inner ring 12 is made in one part. Alternatively, the inner ring 12 may be divided in the axial direction in at least two separate parts secured together. In another variant, the nose 40 may be made separately from, and attached to, the main part of the inner ring 12.

The inner ring 12 comprises an inner cylindrical bore 12*a* and a stepped outer cylindrical surface 12*b* which is radially opposite to the bore 12*a*. In the illustrated example, the bore 12*a* of the inner ring is provided with gear teeth (not referenced). The inner ring 12 further includes two opposite radial frontal faces 12*c*, 12*d* which axially delimit the bore 12*a* and the outer cylindrical surface 12*b*. The frontal faces 12*c*, 12*d* also axially delimit the inner ring 12. The frontal faces 12*c*, 12*d* axially delimit the thickness of the inner ring 12. The protruding nose 44 protrudes radially outwardly from the outer cylindrical surface 12*b*.

The second part 17 of the machine axially abuts against the frontal face 12*c* of the inner ring 12 whereas the first part 15 of the machine axially abuts against the frontal face 10*d* of the outer ring 10. The second part 17 has an assembly surface 17*a* axially bearing against the frontal face 12*c* of the inner ring 12 and the first part 15 has an assembly surface 15*a* axially bearing against the frontal face 10*d* of the outer ring 10 in normal use.

As previously mentioned, the distance sensor 24 is provided to measure radial displacements between the outer and inner rings 10, 12. The distance sensor 24 radially faces the outer cylindrical surface 12*b* of the inner ring 12. The sensor 24 measures radial distances to the outer cylindrical surface 12*b*.

The distance sensor 24 is mounted on the outer ring 10. In the illustrated example, the distance sensor 24 is axially disposed between the row of axial rollers 20 and the frontal face 10*c* of the outer ring 10.

In the described example, the rolling bearing comprises only one distance sensor 24. Alternatively, the rolling bearing may comprise a plurality of distance sensors 24, for example spaced apart in the circumferential direction, preferably regularly.

The outer ring 10 is provided with a radial through-hole 50 and the distance sensor 24 is located or disposed within the through-hole 50. The through-hole 50 extends from the outer surface 10b of the outer ring 10 and opens on the bore 10a. The through-hole 50 radially faces the outer cylindrical surface 12b of the inner ring 12.

Preferably, the through-hole 50 is complementary to the distance sensor 24. The distance sensor 24 is secured inside the hole 50 by any appropriate means, for example by force-fitting.

The distance sensor 24 has a longitudinal axis (not indicated) extending radially and perpendicular to the axis X-X' of the rolling bearing.

In the illustrated example, the distance sensor 24 is located entirely inside the through-hole 50. Alternatively, the distance sensor 24 may slightly protrude radially into the radial space provided between the inner and outer rings 12, 10.

In the disclosed example, the distance sensor 24 also comprises an output connecting cable 52 for transmitting sensing data. Preferably, the output cable 52 extends radially outwardly. The output cable 52 connects the distance sensor 24 to a control unit 60 of the rolling bearing so as to transmit measured distances. Alternatively, the sensor 24 may be formed without any output cable and instead be formed as a wireless sensor.

The sensor 24 may be an inductive distance sensor, inductive proximity switch, an ultrasonic distance sensor, or an optical distance sensor. Alternatively, the sensor 24 may be a mechanical distance sensor provided with a contact stylus. In this case, the stylus of the mechanical sensor contacts the outer cylindrical surface 12b of the inner ring 12.

As previously mentioned, the distance sensor 24 is provided to measure radial distances to the outer cylindrical surface 12b of the inner ring 12.

Before a radial displacement of the inner ring 12 relative to the outer ring 10, the distance sensor 24 measures a first radial distance to the outer cylindrical surface 12b of the inner ring. A second radial distance to the outer cylindrical surface 12b is measured by the sensor 24 after a radial displacement of the inner ring 12 relative to the outer ring 10.

As previously mentioned, the distance sensor 24 is connected to the control unit 60 of the rolling bearing. The control unit 60 is configured to calculate the value of the relative radial displacement between the rings 10, 12 detected by the sensor 24. This value of the relative radial displacement is equal to the difference between the second radial distance and the first radial distance measured by the sensor 24, i.e., the differential measurement of the sensor 24.

From the value of the relative radial displacement between the rings 10, 12 detected by the sensor 24, the control unit 60 is configured to calculate the value of the deflection of the rolling bearing.

The control unit 60 may calculate the value of the deflection of the rolling bearing by subtracting a predetermined value from the calculated value of the relative radial displacement. The predetermined value is equal to the predetermined internal radial clearance of the rolling bearing prior to operation.

For example, the predetermined radial clearance of the rolling bearing may be the internal radial clearance of the roller bearing after mounting the bearing on the associated machine but prior to operation. This internal radial clearance may be equal to the value of the maximum relative radial displacement between the rings 10, 12 which is detected by the sensor 24 and obtained with a minimum load exerted to the bearing. The term "minimum load" is understood to mean the load that is just needed to create relative radial displacement.

Alternatively, the predetermined radial clearance of the rolling bearing may be the initial internal radial clearance of the roller bearing prior to mounting and prior to operation.

The distance sensor 24 allows measurement and continuous monitoring of the operating deflection of the bearing. When the value of the deflection exceeds a predetermined threshold, the control unit 60 may trigger an alarm. This predetermined threshold may be, for example, the value of the deflection above which severe damage can be caused to the rolling bearing.

In the illustrated example, the control unit 60 is located remote from the components of the rolling bearing. Alternatively, the control unit 60 could be mounted on one of the components of the rolling bearing, for example on the outer ring 10 or on the inner ring 12.

As previously mentioned, in the illustrated example, the distance sensor 24 is axially disposed between the row of axial rollers 20 and the frontal face 10c of the outer ring 10. Alternatively, the distance sensor 24 may be positioned at any other appropriate location on the outer ring 10 in order to radially face another zone of the outer cylindrical surface 12b of the inner ring 12, or the outer cylindrical surface of the nose 44 of the inner ring 12.

In the described examples, the distance sensor 24 radially faces a cylindrical surface of the inner ring 12. Alternatively, the distance sensor 24 may radially face an annular tapered surface of a groove formed on the inner ring 12. Such a tapered surface may have a frustoconical shape and be inclined with respect to the axis X-X' of the rolling bearing. Such a tapered surface may be provided when the distance sensor 24 is used to detect both radial and axial displacements between the inner and outer rings 12, 10.

Otherwise, as previously mentioned, in this illustrated example, the first ring of the rolling bearing is the outer ring 10 whereas the second ring is the inner ring 12. As an alternative, it is possible to provide a reversed arrangement with the first ring forming the inner ring and the second ring forming the outer ring. The distance sensor 24 may then be mounted on the inner ring.

In the described examples, the rolling bearing is provided with three rows of rolling elements. Alternatively, the rolling bearing may include only one row of rolling elements, or two rows of rolling elements, or four or more rows of rolling elements. In the illustrated example, the rolling elements are rollers. The rolling bearing may include other types of rolling elements, for example balls. In another variant, the bearing may also be a sliding bearing having no rolling elements.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

I claim:

1. A bearing comprising:
   a first ring;
   a second ring, at least one of the first and second rings being configured to rotate concentrically relative to the other one of the first and second rings;
   at least one distance sensor mounted on the first ring and facing a surface of the second ring to measure radial displacements between the first and second rings; and
   a control unit connected to the distance sensor and adapted to calculate a value of a deflection of the bearing by subtracting a predetermined value from a value of the relative radial displacement between the first and second rings detected by the distance sensor.

2. The bearing according to claim 1, wherein the control unit is adapted to trigger an alarm when the value of the calculated deflection of the bearing is higher than a predetermined threshold.

3. The bearing according to claim 1, wherein the predetermined value is equal to the internal radial clearance of the bearing prior to operation.

4. The bearing according to claim 1, wherein the distance sensor radially faces the surface of the second ring.

5. The bearing according to claim 1, wherein the first ring includes at least one radial through-hole and the distance sensor is at least partially disposed within the through-hole.

6. The bearing according to claim 1, wherein the distance sensor is a proximity sensor.

7. The bearing according to claim 6, wherein the distance sensor is one of an inductive sensor, an ultrasonic sensor, or an optical sensor.

8. The bearing according to claim 1, further comprising:
   at least one row of axial rolling elements arranged between a radial raceway provided on the first ring and a radial raceway provided on the second ring; and
   at least one row of radial rolling elements arranged between an axial raceway provided on the first ring and an axial raceway provided on the second ring.

9. The bearing according to claim 8, wherein the first ring includes an annular groove and the second ring includes a protruding nose engaged into the annular groove of the first ring, the protruding nose being provided with the axial raceway and with the radial raceway of the second ring.

10. A method for monitoring a bearing in a machine, the bearing including a first ring and a second ring, at least one of the first and second rings being configured to rotate concentrically relative to the other one of the first and second rings, the method comprising the steps of:
   measuring a radial displacement between the first ring and the second ring; and
   calculating a value of a deflection of the bearing by subtracting a predetermined value from a value of the measured relative radial displacement between the first and second rings.

11. The method according to claim 10, further comprising the step of triggering an alarm when the value of the calculated deflection of the bearing is higher than a predetermined threshold.

12. The method according to claim 10, wherein the step of measuring a radial displacement between the first and the second rings is performed using at least one distance sensor mounted on the first ring and facing a surface of the second ring.

* * * * *